US009340882B2

(12) United States Patent
Tampucci et al.

(10) Patent No.: US 9,340,882 B2
(45) Date of Patent: May 17, 2016

(54) DEVICE FOR THE PRODUCTION ON-DEMAND OF HYDROGEN BY ELECTROLYSIS OF AQUEOUS SOLUTIONS FROM DRY CATHODE

(75) Inventors: Alessandro Tampucci, Collesalvetti (IT); Paolo Bert, Lari (IT)

(73) Assignee: ACTA S.p.A., Crespina (IT)

( * ) Notice: Subject to any disclaimer, the term of this patent is extended or adjusted under 35 U.S.C. 154(b) by 432 days.

(21) Appl. No.: 13/383,003

(22) PCT Filed: Jul. 9, 2010

(86) PCT No.: PCT/IB2010/053142
§ 371 (c)(1),
(2), (4) Date: Jan. 9, 2012

(87) PCT Pub. No.: WO2011/004343
PCT Pub. Date: Jan. 13, 2011

(65) Prior Publication Data
US 2012/0103829 A1 May 3, 2012

(30) Foreign Application Priority Data
Jul. 10, 2009 (IT) .................. FI2009A0153

(51) Int. Cl.
C25B 1/10 (2006.01)
C25B 9/10 (2006.01)
C25B 1/02 (2006.01)
C25B 1/04 (2006.01)

(52) U.S. Cl.
CPC ... *C25B 1/10* (2013.01); *C25B 1/02* (2013.01); *C25B 1/04* (2013.01); *C25B 9/10* (2013.01); Y02E 60/366 (2013.01); Y02P 20/133 (2015.11)

(58) Field of Classification Search
CPC .............. C25B 1/02; C25B 1/04; C25B 1/10; C25B 15/08
USPC ......................................................... 205/637
See application file for complete search history.

(56) References Cited

U.S. PATENT DOCUMENTS 4,388,162 A * 6/1983 Sammells et al. ............. 205/638
6,745,105 B1 * 6/2004 Fairlie et al. .................. 700/273
2003/0196893 A1 10/2003 McElroy et al.
(Continued)

FOREIGN PATENT DOCUMENTS

EP 0583215 A1 8/1993
JP 129389 A 5/1990
(Continued)

OTHER PUBLICATIONS

JP 94033474 B2—May 1994, Japan, Kawami Y et al. English translation of JP 94033474 B2 (same family as JP2129359A).*
(Continued)

*Primary Examiner* — Nicholas A Smith
(74) *Attorney, Agent, or Firm* — Abelman, Frayne & Schwab

(57) ABSTRACT

This invention relates to a device for the electrolytic production of hydrogen which can operate discontinuously or associated to strong power fluctuations and provide dry pressurized directly hydrogen, with high purity. The device for the electrolytic production of hydrogen from an alkaline aqueous solution, starting from dry cathode, comprises two half-cell, anodic and cathodic, separated by an anionic exchange membrane whose surface in contact with the cathodic half-cell is a membrane-electrode assembly (MEA), and the alkaline solution is present only in the anodic half-cell.

18 Claims, 1 Drawing Sheet

(56) References Cited

U.S. PATENT DOCUMENTS

2007/0207350 A1* 9/2007 Highgate .................. 429/13
2009/0294282 A1* 12/2009 Basseguy et al. ............ 204/252
2009/0294283 A1* 12/2009 Norman et al. ............. 204/279

FOREIGN PATENT DOCUMENTS

| JP | 2129389 A | 5/1990 |
|---|---|---|
| WO | 2006/074829 A1 | 7/2006 |
| WO | 2007/082898 A2 | 7/2007 |
| WO | 2009/007922 A1 | 1/2009 |
| WO | 2009/093042 A1 | 7/2009 |

OTHER PUBLICATIONS

International Search Report and Written Opinion, PCT/IB2010/053142, Dec. 1, 2010 (13 pages).
Office Action and translation from corresponding CN 201080035892.9 dated Jan. 28, 2015 (8 pages).

* cited by examiner

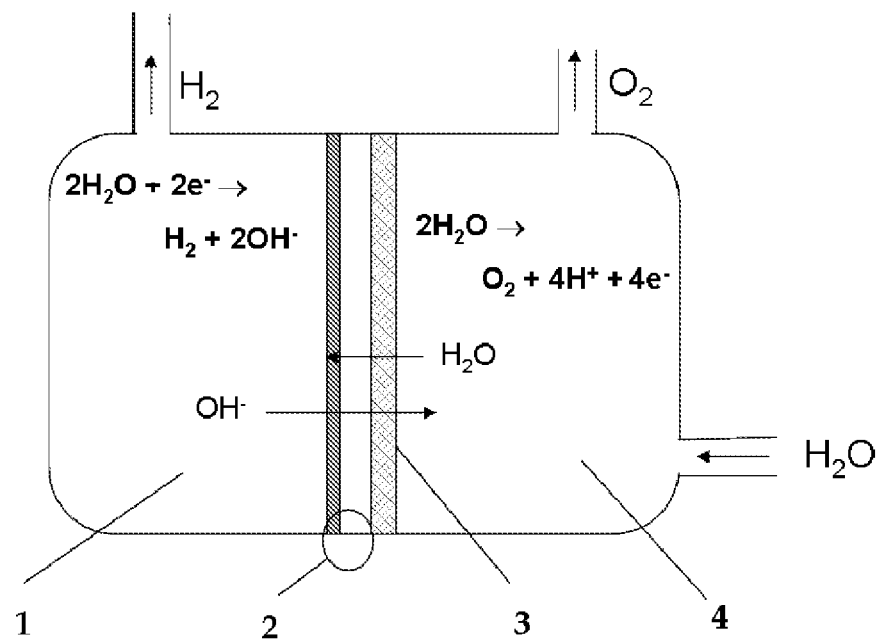

DEVICE FOR THE PRODUCTION ON-DEMAND OF HYDROGEN BY ELECTROLYSIS OF AQUEOUS SOLUTIONS FROM DRY CATHODE

CROSS-REFERENCE TO RELATED APPLICATIONS

This application is a national phase application under 35 USC §371 of PCT Patent Application Number PCT/IB2010/053142, which claims the benefit of Italian Patent Application Number FI2009A000153 filed on Jul. 10, 2009, which are both incorporated by reference herein.

FIELD OF INVENTION

The invention relates to the field of devices for the electrolytic production of hydrogen.

STATE OF THE ART

Hydrogen can be produced from multiple sources such as fossil fuels (by reforming reactions) or by electrolysis. Desiring to get it by means of electrolytic devices, one of the cheapest source of hydrogen is water.

The electrolysis of water is, among the methodologies used to produce hydrogen, the one that allows to obtain high purity gases and, if the energy source for the electrolysis arises from renewable sources, low environmental impact.

The half-reactions of water electrolysis are:

$$2H_2O+2e^- \rightarrow H_2+2OH^- \quad \text{cathode}$$

$$2H_2O \rightarrow O_2+4H^++4e^- \quad \text{anode}$$

For the production of electrodes for the electrolysis reaction are generally used metals and alloys arranged in the form of nets or plates or, as alternative, may be used electrocatalysts made of one or more metals selected from noble metals (such as but not only Re, Ru, Rh, Os, Ir, Pt, Pd—Au, Cu, Ag) or non-noble (such as Fe, Co, Ni, Zn, Mo), such as, but not limited to, those described in WO2007/082898.

The commercially available electrolysers for hydrogen production have different structures depending on the amount and on the purity of the hydrogen required.

Industrial scale electrolysers consist of two half-cells containing the electrodes (made by steel disks, for the simplest set-up), separated by a porous septum within circulates the electrolyte (alkali electrolysers usually use KOH) and which does not allow a defined physical separation of the hydrogen and the oxygen produced. The gases are only polarized by the current at the electrodes. Therefore if the production of hydrogen—directly compressed in the electrolyser—is required, a perfect balance of the pressure of the two gases is necessary and a perfectly constant current flow must be maintained, to prevent the formation of an explosive mixture (and the resulting explosion). Consequently, this type of electrolysers is usually used to produce hydrogen at a pressure not higher than 7 bar with power supply connected to the grid and is not suitable to be coupled directly to renewable energy sources, inherently discontinuous. The hydrogen produced must be compressed up to the storage pressure, requiring an additional amount of energy.

Small-scale electrolysers (usually used for hydrogen production in laboratory scale), instead of the porous septum and the alkaline solution, contain a polymeric proton exchange membrane (usually Nafion®). The membrane forms a physical barrier between the two gases and it is therefore possible to produce the two gases at high differential pressures (up to 100 bar), typically oxygen is at ambient pressure and hydrogen is pressurized at 50 bar. This is necessary in order to prevent the formation of explosive mixtures both in the occurrence of power fluctuations and in case of accidental perforation of the membrane.

The spread of such devices on an industrial scale is hindered by the scarcity and the high cost of the materials used for the membrane-electrode assembly. Indeed, the protonic membrane, working at a pH comprised between 0.5 and 1, requires platinum cathodes, anodes made by Platinum-Iridium and electrodes plated by platinum or ruthenium.

In addition, for each water molecule that splits into the gases, three molecules are transported from the anodic half-cell to the cathode, due to electro-osmosis. It generates a dual circuit for the water, one at low and one at high pressure, and the need to separate the hydrogen produced from water by a dehumidification/drying step.

The devices known in the State of the Art however require that the anode and the cathode are immersed in, or otherwise in contact with, solutions containing electrolytes.

The purpose of this invention is to provide a safe device for the production, even on an industrial scale, of pressurized hydrogen, pure and dry, by electrolysis of aqueous solution, possibly directly supplied from renewable energy sources, intermittent.

DEFINITIONS AND ABBREVIATIONS

AEM=Anoinic Exchange Membrane
MEA=Membrane-Electrode assembly

SUMMARY OF THE INVENTION

This invention allows to overcome the problems associated with the currently commercially available electrolytic devices for hydrogen production, using an electrolytic device for the electrolytic production of hydrogen from an aqueous alkaline solution, starting from dry cathode, the device comprising (referring to FIG. 1):

two half-cells, anodic (4) and cathodic (1), separated by an anion exchange membrane (AEM) whose surface in contact with the cathodic half-cell is a membrane-electrode assembly (MEA) (2), and the alkaline solution is present only in the anodic half-cell (4).

Said device can operate discontinuously and provide directly dry pressurized hydrogen, with high purity.

The cathode side of the device does not contain any alkaline solution, and then at the start-up the cathode of the device is dry. In the electrolyser of this invention, the alkaline solution is fed exclusively to the anodic half-cell. Due to its hydrophilicity, the anion exchange membrane is completely soaked in water up to the surface layer in contact with the cathodic half-cell.

Such amount of water is adequate for the formation of hydrogen at a rate that allows only the electrolysis reaction without the evaporation of water. In this way the hydrogen produced has high purity (without any electrolytes) and is dry. The OH⁻ ions formed during the cathodic half-reaction migrate through the membrane towards the other half-cell, ensuring the conditions for electrolytic equilibrium.

Therefore this invention relates also to a method for the production of pressurized hydrogen, dry, with high purity, said method comprising the use of an electrolytic device, as described above, operating with feeding of an aqueous alkaline solution exclusively at the anodic cell.

BRIEF DESCRIPTION OF FIGURES

FIG. 1 shows a possible structure of the device of the invention

DETAILED DESCRIPTION OF THE INVENTION

To allow an intimate contact between the membrane and the cathodic electrode is preferable that the cathode consists of cathodic electrocatalysts deposited directly on the ion exchange membrane, thereby obtaining a MEA device (membrane-electrode assembly).

As MEA kind, can be used, but not limited to, those described in patent WO2006/074829 or those described in the literature as active in promoting the reaction of electrolysis of aqueous alkali solution. In the anodic half-cell electrocatalysts can be deposited on suitable conductive substrates, such as various kinds of wire mesh and texture, or alternatively directly on the ion-exchange membrane (MEA).

In order to reduce the working voltage of the device, active anodic and cathodic electrocatalysts can be used, known for the reaction of water electrolysis, containing for example metals or metal alloys based on non-noble metals (e.g. Fe, Cu, Co, Ni, Zn, Mo, Mn) or noble metals (such as but not limited to Re, Ru, Rh, Os, Ir, Pt Pd, Au, Ag). For example as electrocatalysts can be used those described in WO2007/082898 containing Mn, Mo, Fe, Co, Ni, Pd, Ir and mixtures thereof.

For the cathode, electrocatalysts based on Ni, Co, Fe and mixtures thereof are preferred.

For the anode, electrocatalysts based on Cu, Co, Ni, Mn and mixtures thereof are preferred.

The anion exchange membrane that separates the two half-cells preferably has a thickness between 30 and 150 microns.

The polymeric anion exchange membrane is a physical barrier in the two half-cells between the two gases, which does mix even after prolonged periods of inactivity of the device. This results in multiple benefits:

High purity of the hydrogen produced, free from oxygen, water and salts used as electrolytes;

The possibility to store hydrogen directly pressurized up to a differential pressure between the cathodic and the anodic compartment of 100 bar;

The possibility to operate the device discontinuously or with strong power fluctuations and therefore the chance to work upon request (on demand) or in combination with renewable energy.

The electrolytic device of this invention may comprise a single electrolytic cell or a stack of cells, that have all the characteristics listed above.

The method for the hydrogen production is a further object of this invention. It preferably consist in the application to the electrodes of an electric potential difference comprised between 1.5 and 3.0 volts, with a corresponding current density not higher than 1 A/cm$^2$.

According to the above mentioned method, the device preferably works at a cell temperature below 60° C. The salts used as electrolytes for the preparation of an aqueous alkaline solution may be selected among inorganic bases of alkali metals and alkaline earth metals, preferably as electrolytes KOH and $K_2CO_3$ are used.

For an advantageous feature, the device is also efficient using an alkaline solutions in which the electrolyte is present at concentrations less than 5 wt %. These concentrations are significantly lower than those generally used in devices currently on the Market, which typically use 30 wt % of KOH.

The use of dilute solutions (preferably 0.5-2.0 wt %) is obviously an advantage in terms of economic savings of raw materials and greater safety in the handling of the solutions. Even the device of the invention works with electrolytes such as carbonates that, compared to hydroxides, have a better safety profile in handling. The hydrogen produced with this method is obtained pressurized at pressures up to 100 bar.

The electrolyser of the invention has considerable technical advantages over the State of the Art, and high efficiency since does not require additional mechanical devices such as compressors or dryers.

The hydrogen produced by this type of device can be used for all applications requiring an high purity product and possibly dry, such as but not limited to fuel cells, internal combustion engines, use in hydrogenation reactions of food and not only, use in metallurgical applications, use in chemical analysis techniques such as gas chromatography, etc.

The device of this invention, due to the opportunity to be built in small size and the ability to work discontinuously, and therefore to produce hydrogen on demand, can be combined with other devices that use hydrogen; for example, it can be combined with equipment for catalytic hydrogenation, with gas chromatographs, with internal combustion engines (also on board).

This invention will be better understood in light of the following example of the invention in which the electrolyser anode electrode is made similarly to the example 4 of the patent WO2007/082898, and the cathode electrode, based on Ni, is made as MEA, in a similar manner as described in Example 1 of patent WO2006/074829.

Example 1

Production of the Anodic Electrode 4.5 g of $CuSO_4.5H_2O$ and 10 g of $CoCl_2.6H_2O$ were dissolved in 200 mL of distilled water. This solution was added to a solution of 12 g of $Na_2CO_3$ dissolved in 150 mL of distilled water. The precipitate formed was filtered and washed with water. The powder, after being dried in vacuum oven, was pyrolized at 400° C. for 5 hours in air. The mixture was mixed with Teflon 10 wt % in distilled water, in amount sufficient to obtain a spreadable paste. This paste was applied on a net of metallic nickel.

Example 2

Production Membrane Cathode Electrode Assembly

An anion exchange membrane Acta M6 (prepared similarly to Example 1 of patent WO2009/007922, sample SBSF14) in circular shape of diameter 50 mm is pre-treated for 1 hour with a 1 M KOH solution to enable the exchange of the membrane to a hydroxylic form, and then fixed within a circular hollow mold with inner diameter of 48 mm and there sealed.

A solution made by 2 g $NiSO_4.6H_2O$, 2 g $NaH_2PO_3$, 5 g of sodium citrate dissolved in 100 mL of distilled water and then added with ammonium hydroxide to pH 10 is placed inside a mold cavity, in contact with one surface of the membrane. After 1.5 hours the solution is removed from the mold and the membrane is then rinsed three times with deionized water.

Example 3

Device Assembling

One of the favorites assembly of cell is obtained placing in direct contact the assembled MEA 2, metalized only on cathode side (as described in Example 2), with the anode 3, made in accordance with Example 1. The anodic half-cell 4 is fed with an alkaline solution and the cathodic half-cell contains only the hydrogen produced by electrolysis process.

Example 4

Hydrogen Production

The overall area of the electrodes of the electrolytic device was 78.5 cm$^2$. The anodic half-cell was fed with an alkaline aqueous solution containing 1 wt % of KOH.

As the cell temperature was 30° C., the applied voltage was 1.9 V, with a corresponding current density of 0.5 A/cm$^2$. The hourly output measured was 13.5 L/h (faradic efficiency 75%), reaching a pressure of 50 bar. The test was run for 1008 h (6 weeks) without significant change of voltage and of the amount of hydrogen produced.

Example 5

Production of Hydrogen

The overall area of the electrodes of the electrolytic device was 63.6 cm$^2$. The anodic half-cell was fed with an alkaline aqueous solution containing 1 wt % of $K_2CO_3$.

As the cell temperature was 45° C., the applied voltage was 2.25 V with a corresponding current density of 0.47 A/cm$^2$. The hourly output measured was 14.3 L/h (104% faradic efficiency), reaching a pressure of 40 bar. The test was run for 4 weeks without significant change in voltage and of the amount of hydrogen produced.

The invention claimed is:

1. Device for the electrolytic production of hydrogen from an alkaline aqueous solution, starting from dry cathode, the device comprising:
   two half-cell, anodic and cathodic, separated by an anionic exchange membrane whose surface in contact with the cathodic half-cell is a membrane-electrode assembly (MEA), and
   a source of alkaline solution in direct fluid communication with the anodic half-cell, and not the cathodic half-cell, and therefore the alkaline solution is present only in the anodic half-cell, wherein the alkaline solution contains an inorganic alkaline or alkaline earth metal at a concentration less than or equal to 2 wt %;
   wherein the cathode half-cell is dry and contains only the hydrogen produced by the electrolysis process.

2. Device according to claim 1, wherein the cathode of said membrane electrode assembly consists of cathodic electrocatalysts deposited directly onto the membrane.

3. Device according to claim 1, wherein the electrocatalysts in the anodic half-cell are deposited on suitable conductive substrates, such as various kinds of wire mesh and texture, or alternatively directly on the ion exchange membrane.

4. Device according to claim 1 in which the anodic and cathodic electrocatalysts are metals or metal alloys made of noble metals selected from the group Re, Ru, Rh, Os, Ir, Pt, Pd, Au, and Ag, or non-noble chosen in the group Fe, Co, Ni, Zn, Cu, Mn and Mo.

5. Device according to claim 4 in which the electrocatalysts for the cathode are selected from the group Ni, Co, Fe and mixtures thereof.

6. Device according to claim 4 in which the electrocatalysts for the anode are selected in the group Cu, Co, Ni, Mn and mixtures thereof.

7. Electrolytic device comprising a stack of electrolytic cells as described in claim 1.

8. A method for the production of pressurized hydrogen, dry, with high purity, said method comprising the use of an electrolytic device according to claim 1, fed exclusively to the anodic cell with an aqueous alkaline solution which contains an inorganic alkaline or alkaline earth metal at a concentration less than or equal to 2 wt %, and the cathode half-cell is dry and contains only the hydrogen produced by the electrolysis process.

9. A method according to claim 8 in which between the two electrodes is applied an electric potential difference in the range 1.5-3.0 volts corresponding to a current density not exceeding 1 Amp/cm.

10. A method according to claim 8 wherein the cell temperature is lower than 60° C.

11. A method according to claim 8 in which the alkaline solution contains an inorganic alkaline or alkaline earth metal at a concentration of 0.5-2.0 wt %.

12. A method for feeding an apparatus that consumes hydrogen, said method comprising combining a device according to claim 1 with said apparatus so that the apparatus is directly fed with hydrogen produced by the device.

13. An apparatus that consumes hydrogen, said apparatus combined with a device according to claim 1.

14. Device according to claim 1, wherein the alkaline solution contains an inorganic alkaline or alkaline earth metal at a concentration of 0.5-2.0 wt %.

15. Device according to claim 1, wherein the alkaline solution contains KOH.

16. Device according to claim 1, wherein the alkaline solution contains $K_2CO_3$.

17. Method according to claim 8, wherein the alkaline solution contains KOH.

18. Method according to claim 8, wherein the alkaline solution contains $K_2CO_3$.

* * * * *